(12) United States Patent  (10) Patent No.: US 12,000,769 B2
Zhukov  (45) Date of Patent: Jun. 4, 2024

(54) PARTICLE STANDARDS FOR REFLECTED LIGHT SCATTER MEASUREMENTS FROM DEGENERATE PARTICLE FOCI

(71) Applicant: Cellular Highways Ltd., Melbourn (GB)

(72) Inventor: Alexander Zhukov, Melbourn (GB)

(73) Assignee: Cellular Highways Ltd, Melbourn (GB)

( * ) Notice: Subject to any disclaimer, the term of this patent is extended or adjusted under 35 U.S.C. 154(b) by 210 days.

(21) Appl. No.: 17/401,370

(22) Filed: Aug. 13, 2021

(65) Prior Publication Data
US 2022/0057316 A1  Feb. 24, 2022

(30) Foreign Application Priority Data
Aug. 20, 2020 (EP) .................................. 20191979

(51) Int. Cl.
*G01N 15/10*  (2024.01)
*G01N 15/0205*  (2024.01)
(Continued)

(52) U.S. Cl.
CPC ..... *G01N 15/1012* (2013.01); *G01N 15/0205* (2013.01); *G01N 15/1425* (2013.01); *G01N 15/1434* (2013.01); *G01N 2015/0238* (2013.01)

(58) Field of Classification Search
None
See application file for complete search history.

(56) References Cited

U.S. PATENT DOCUMENTS 4,260,258 A * 4/1981 Rose .................. G01N 15/1463
250/573
5,691,486 A * 11/1997 Behringer .......... G01N 35/1097
73/863.73

(Continued)

FOREIGN PATENT DOCUMENTS

CN  101416045 A * 4/2009 ......... G01N 15/0205
CN  108896453 A * 11/2018 ............... G01F 1/32

OTHER PUBLICATIONS

Kotz, Kenneth T., et al. "Inertial focusing cytometer with integrated optics for particle characterization." Technology 1.01 (2013): 27-36. (Year: 2013).*

(Continued)

*Primary Examiner* — Rufus L Phillips
(74) *Attorney, Agent, or Firm* — Erise IP, P.A.

(57) ABSTRACT

A method of selecting a type of particle for use in standardisation and/or calibration of a flow cytometer. The method includes determining the location of two or more particle focal points of particles flowing through a cross section of a channel in the flow cytometer; for each type of particle, determining for each particle focal point, for a beam of light directed at a type of particle at said particle focal point from a first direction, the total intensity of light scattered along a second direction; determining the difference between the highest and lowest determined light intensities of the light intensities determined at the two or more particle focal points; and selecting a type of particle for which the difference between the highest and lowest determined light intensities at the two or more particle focal points is below a predetermined threshold.

8 Claims, 4 Drawing Sheets

(51) Int. Cl.
    *G01N 15/14*     (2024.01)
    *G01N 15/1434*     (2024.01)

(56) References Cited

U.S. PATENT DOCUMENTS

| | | | |
|---|---|---|---|
| 9,347,595 B2 | 5/2016 | Toner et al. | |
| 2009/0014360 A1* | 1/2009 | Toner | B01D 21/0087 209/208 |
| 2012/0063664 A1* | 3/2012 | Di Carlo | G01N 15/1404 382/133 |
| 2014/0315288 A1* | 10/2014 | Miyamura | G01N 33/5094 29/428 |
| 2016/0370282 A1* | 12/2016 | Zhan | G01N 15/0606 |
| 2018/0080870 A1* | 3/2018 | Yamamoto | G01N 21/4788 |
| 2021/0310930 A1* | 10/2021 | Toumbas | G01N 15/0205 |

OTHER PUBLICATIONS

Wang, Lili, et al., "Standarization, Calibration, and Control in Flow Cytometry," Curr. Protoc. Cytom. 79:1.3.1-1.3.27. doi: 10.1002/cpcy.14, Jan. 2017.

Watts, Benjamin R., et al., "Scattering Detection Using a Photonic-Microfluidic Integrated Device With On-Chip Collection Capabilities," Electrophoresis, 35, 271-281, 2014.

Peperzak, Louis, et al., "NIOZ Flow Cytometer Workshop, Comparing Organism Detection Instruments in Measuring," 2-10 μm and 10-50 μm plankton cells. Final report, prepared for Interreg IVB Project Ballast Water Opportunity, 2013, p. 1-64.

European Patent Application 20191979.2, European Search Report dated Apr. 12, 2021.

* cited by examiner

Figure 2

PARTICLE STANDARDS FOR REFLECTED LIGHT SCATTER MEASUREMENTS FROM DEGENERATE PARTICLE FOCI

RELATED APPLICATIONS

The present application is a U.S. national application under 35 U.S.C. § 119 of European Patent Application 20191979.2, filed 20 Aug. 2020, the disclosure of which is incorporated herein by reference.

BACKGROUND

Scattering of light is commonly used to measure physical properties of particles, such as biological cells, in flow cytometry.

Light scattering at small angles, typically of less than 20 degrees, also known as "forward scatter" or FSC, is often related to the size of a cell or particle. Light scattering at large angles, also known as "side scatter" (SSC) or "back scatter" (BSC), is more sensitive to the presence of granular structure on similar length scales to the light wavelength, i.e., typically much smaller than the size of the cell itself. FSC and SSC are commonly used for differentiating types of cells with different light scattering properties, such as lymphocytes, monocytes and other types of white blood cells. More generally, light scatter can be performed at any angle.

In order to obtain precise light scattering measurements, the light source is typically a focused laser beam, and the particles are presented to the laser focus in a focused flow within a channel. Thus, both the light and the particle positions are focused. The common method of particle focusing is known as sheath flow or hydrodynamic focusing. However, other methods such as acoustic, electrophoretic, or inertial focusing methods are available.

Inertial focusing in particular is attractive for precise positioning of the particles along the width of a low aspect ratio channel, where aspect ratio is defined as the channel height divided by the channel width, and low aspect ratio means an aspect ratio less than one, i.e., the height of the channel is less than its width. However, inertial focusing typically results in degenerate foci. These are twin positions within the channel cross-section through which particles flowing in the channel will pass and are a consequence of the way in which an inertial focuser with rectangular cross-section focuses a stream of particles into two streamlines, each adjacent to the center of the two wider faces. Inertial focusing is described in U.S. Pat. No. 9,347,595 B2.

In transmission measurements of light scattering along an optical axis passing through the twin inertial foci, which may be carried out on a channel on a transparent substrate or within a transparent cuvette, the twin inertial foci are almost indistinguishable. However, in other measurements of light scattering the light may interact differently with particles at the two foci.

In flow cytometers that employ a channel on a substrate, it is often desirable to examine particles on an opaque substrate. Various opaque substrates are available that have attractive electronic, magnetic, thermal, mechanical or fabrication properties, for example silicon. These properties can be used to combine microelectromechanical systems (MEMS) devices with optical measurements. Moreover, for the design of an instrument with a separate fluidic cartridge or consumable, it is often convenient to expose the substrate optically on one side only, allowing the other side to be used for manual access, fluidic pipes, or to screen the other side from the laser beam.

Optically smooth substrates, such as polished silicon wafers, or thin films that are deposited on these substrates, such as metal films deposited by thermal vapor deposition, sputtering or chemical vapor deposition, can function as mirrors to a laser beam and scattered light. Light scattering measurements can therefore be made in reflection—the substrate surface reflects the light, preserving its amplitude, phase and angle. For a laser beam oriented perpendicularly to the surface, the light returning close to the optical axis will generally be dominated by forward scatter, albeit reflected by the surface. We refer to this as reflected forward scatter (rFSC) below. As the direction of light collection tends towards the perpendicular to the optical axis, the measurement tends towards a true side scatter measure. Measurements close to the perpendicular are referred to below as reflected side scatter (rSSC) below.

However, measuring scattered light that has been reflected by an opaque substrate can present a challenge if there are multiple particle foci in the channel, such as when using an inertial focuser. In these instances, the reflected scattered light intensity, as a function of angle, generally depends on the height of the particle above the reflecting surface, i.e., an identical particle in each of the foci will in general give different rFSC and rSSC measurements. This effect is because of double scattering: the light first passes through the particle, which scatters the light, before it is reflected by the surface and passes through the particle a second time, generating further scattered light. The combined scattering depends on the path length between the first and second scattering events, i.e., twice the distance to the surface. Since the foci have different distances to the surface, they result in a different optical train and therefore different rFSC and rSSC measurements.

For particles of low refractive index difference with the fluid medium, as for example many biological cells, the difference in rFSC and rSSC measurements between the particles at different foci may be negligible. However, for calibration beads used in cytometry, typically made from polystyrene or other materials, the difference in refractive index between the beads and the fluid medium may be considerable, and thus measurements for particles at different foci give rise to multiple peaks on a histogram of rFSC or rSSC.

The effects of the degeneracy in particle foci on light scattering measurement from identical particles is therefore undesirable in flow cytometry. Cytometry calibration and quality control typically employ stable, inert particle types, such as monodisperse, that is to say uniform in size, polystyrene beads to provide a standard measurement. This standard measurement may, for example, provide a quality control test of measurement precision or a relative intensity for comparison of a sample particle.

In the example of quality control testing, a series of measurements may be taken using the monodisperse polystyrene beads and the consistency of the measurements will give an indication of the precision of the measurements. A close grouping of measurements of individual particles will indicate that the cytometer and measurement apparatus is capable of an accurate measurement, while large variations in the measurements indicate that the cytometer and measurement apparatus are inaccurate. The coefficient of variation (CV), defined as the standard deviation divided by the mean of a set of measurements, is typically used to quantify measurement accuracy. The measurement CV of a set of standard particles directly gives an expected accuracy for measuring any other type of particle with the cytometer.

Standardized measurements taken using standardized particles, such as monodisperse polystyrene beads, can also be used to provide a calibration standard for comparison of measurements of other particles. For example, the size of biological particles can be determined by comparison with measurements taken with the standardized particles as there is typically a proportional relationship between measurements taken of a biological particle a given size and the measurements taken of a standardized particle of the same size.

However, if the rFSC and rSSC measurements differ for particles at different foci then they will not give a single standardized measurement. The problem is therefore how to provide a standard particle for reflected light scatter measurements from degenerate particle foci.

SUMMARY OF THE INVENTION

According to a first aspect of the invention a method of selecting a type of particle for use in standardisation and/or calibration of a flow cytometer is provided. The method comprises:
  (a) determining the location of two or more particle focal points of particles flowing through a cross section of a channel in the flow cytometer;
  (b) for each type of particle of two or more different types of particle:
    (b1) for each particle focal point of the two or more particle focal points, determining, for a beam of light directed at a particle of said type at said particle focal point from a first direction, the total intensity of light scattered along a second direction, the second direction lying within 90 degrees of the first direction; and
    (b2) determining, for the type of particle, the difference between the highest and lowest determined light intensities of the light intensities determined at the two or more particle focal points; and
  (c) selecting a type of particle for which the difference between the highest and lowest determined light intensities of the light intensities determined at the two or more particle focal points is below a predetermined threshold.

As explained above, there may be several points at which particles flowing through the channel are focused, referred to herein as particle focal points, and the optical path of scattered light that is reflected from the substrate of the channel will differ for particles at each of these particle focal points, which may lead to differences in reflected scatter measurements. These differences can lead to a high degree of variability of the measurements taken using standardized particles, such as polystyrene beads, which presents difficulties when those particles are used for standardization and/or calibration of a flow cytometer.

In order to address these problems, the method according to the first aspect allows for a type of particle to be selected for which the differences in reflected scatter measurements at the particle focal points are minimized. This reduces the variability in the measurements taken using the selected type of particle, and these particles therefore allowing for improved standardization and/or calibration of the flow cytometer.

Rather than carrying out step (b1) of the method experimentally, the light scattered along the second direction for each particle focal point is typically determined theoretically, for example by using ray tracing software. This may involve taking account of the interference between light scattered along different paths. The beam of light incident along the first direction is typically modelled as being coherent light, since in most applications of the flow cytometer the incident light used when taking scattering measurements will also be coherent.

Typically, the light scattered along the second direction comprises light reflected from the particle, light refracted by the particle, and light reflected from the lower surface of the channel, and the determination of the intensity of light scattered along the second direction involves determining the amplitude and phase of the light traveling along each of these paths and how the light traveling along each of the paths interferes with the light traveling along the other paths.

Step (b1) leads to two or more determined intensities of light scattered along the second direction—one for each particle focal point. The difference between the highest and lowest of these is then determined in step (b2). This difference could be an absolute value, but is typically expressed as a percentage ratio between the absolute difference and the mean or median of the highest and lowest determined light intensities. The lower the difference between the two for a particle of a given type, the less variability there will be in the measurements taken by a particle of that type. The predetermined threshold is then set based on the desired accuracy of measurements taken using the selected type of particle.

The selection of the type of particle for use in standardization or calibration will typically be between candidates that similar to each other, and to this end, the two or more different types of particle may have the same refractive index. The two or more different types of particles may also, in some embodiments, be made of the same material.

In some embodiments, the selection of the type of particle may be between two or more different types of particles that each have a different diameter. This will most preferably be the case when the two or more different types of particles have the same refractive index, and will usually be the case when the two or more types of particle are made of the same material.

The two or more types of particles may all have the same shape. For example, they may all be spherical particles. Alternatively, the two or more types of particles may comprise particles of two or more different shapes.

Often, the shape and composition of the particles to be used in standardization or calibration will be selected in advance. For example, in many applications polystyrene beads are preferred. In these cases, the selection of a type of particle involves determining a diameter of particle for which the differences in light intensity measurements along the second direction are minimized.

The first direction will typically lie along a normal to the lower surface of the channel. This is particularly advantageous when the two or more particle focal points lie along said normal as it ensures the beam of incident light will scatter from a particle whichever of the particle focal points it is located at, without requiring the beam to have a large width.

In embodiments where the first direction lies along a normal to the lower surface of the channel, the second direction ordinarily lies at an angle of less than 20 degrees to the first direction. The method of the first aspect is particularly advantageous when the flow cytometer is to be used to take reflected forward scatter (rFSC) measurements, in which case measurements during use of the flow cytometer will be taken at small angles, typically less than 20 degrees, from the normal to the lower surface of the channel.

In many embodiments of the invention of the first aspect, the particle focal points lie on a normal to the lower surface of the channel, for example when the flow cytometer comprises an inertial focuser upstream of the channel.

The method of the first aspect is typically used when scattering measurements cannot be taken in transmission. Therefore, the lower surface of the channel will, in most cases, be opaque.

As explained above, the predetermined threshold is selected based on the accuracy required during standardization and/or calibration of the flow cytometer. It is, however, preferably less than or equal to 10%, and is more preferably less than or equal to 5%.

According to a second aspect of the invention, a method of selecting a type of particle for use in standardization and/or calibration of a flow cytometer is provided. The method comprises:
(a) for each type of particle of two or more types of particle, determining, for a plurality of particles of said type flowing through a channel in the flow cytometer, for a beam of light directed at the channel along a first direction, the coefficient of variation in the total intensity of light scattered along a second direction, the second direction lying within 90 degrees of the first direction; and
(b) selecting a type of particle for which the coefficient of variation is below a predetermined threshold.

The method according to the second aspect of the invention provides an alternative method of selecting a type of particle for use in standardization and/or calibration of a flow cytometer based on the use of the coefficient of variation to determine the range of light intensities for particles at the two or more particle focal points.

While the coefficient of variation can be determined theoretically, such as by using ray tracing software, the method according to the second aspect is particularly suited to determining the type of particle to use in standardization and/or calibration experimentally. This is because, for the purposes of determining the coefficient of variation, it is not necessary to know which of the particle focal points a particle is located at when determining the intensity of light scattered along the second direction for that particle.

Typically, a series of particles of a given type will typically be directed along the channel in the flow cytometer and measurements taken of the total intensity of light scattered along the second direction for each of the particles. The mean and standard deviation of these measurements will then be determined, with the standard deviation divided by the mean to give the coefficient of variation. A particle is then selected for which the coefficient of variation is below a predetermined threshold. As with the first aspect, the predetermined threshold is selected based on the desired accuracy of measurements taken using the selected type of particle. The predetermined threshold is preferably less than or equal to 10%, and is more preferably less than or equal to 5%.

BRIEF DESCRIPTION OF THE DRAWINGS

Examples will now be described, by way of example, with reference to the accompanying figures in which:

FIG. 2 shows ray tracing predictions of rFSC measurements of a lymphocyte as a function of distance from the substrate;

DETAILED DESCRIPTION

Figure 1:
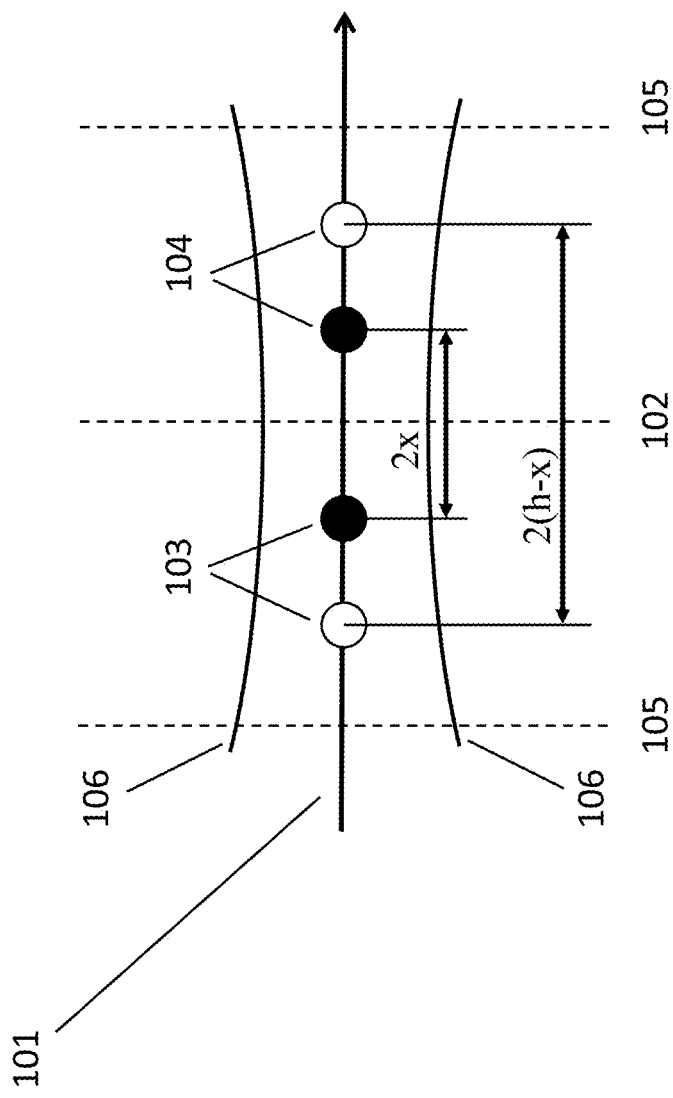
FIG. 1 shows an optical train diagram for measuring rFSC of a particle in degenerate inertial foci in a channel.

FIG. 1 shows a geometric model of reflected forward scatter, in the form of an optical train. A laser beam 101 is focused at the substrate surface 102, where the beam focus width is significantly greater than the particles to be measured. Thus, the incident light is close to a collimated beam while passing through the particle to be measured. The light passes through the particle 103 before impinging on the surface. It then passes through the same particle again, shown as a reflection image 104. The upper boundary of the channel 105 is also labelled, both before and after the reflection. Note that the channel height is defined as the distance between the substrate surface 102 and the upper boundary of the channel 105. The Gaussian waist of the laser beam is also depicted as 106. The channel width is not shown in FIG. 1.

As discussed above, inertial focusing typically leads to degenerate particle foci and the particles will therefore typically pass through one of two points in the cross section of the channel. These two positions are shown in FIG. 1 and are at a distance x and a distance h-x from the substrate surface, where h is the height of the channel and x is a distance dependent on factors such as the height of the channel, the width of the channel, the medium in which the particles are dispersed, and the speed at which the particles are flowing through the channel. The path length between the first and second scattering events will therefore be either 2x or 2(h-x), depending on which of the two foci the particle passes through.

Figure 2:
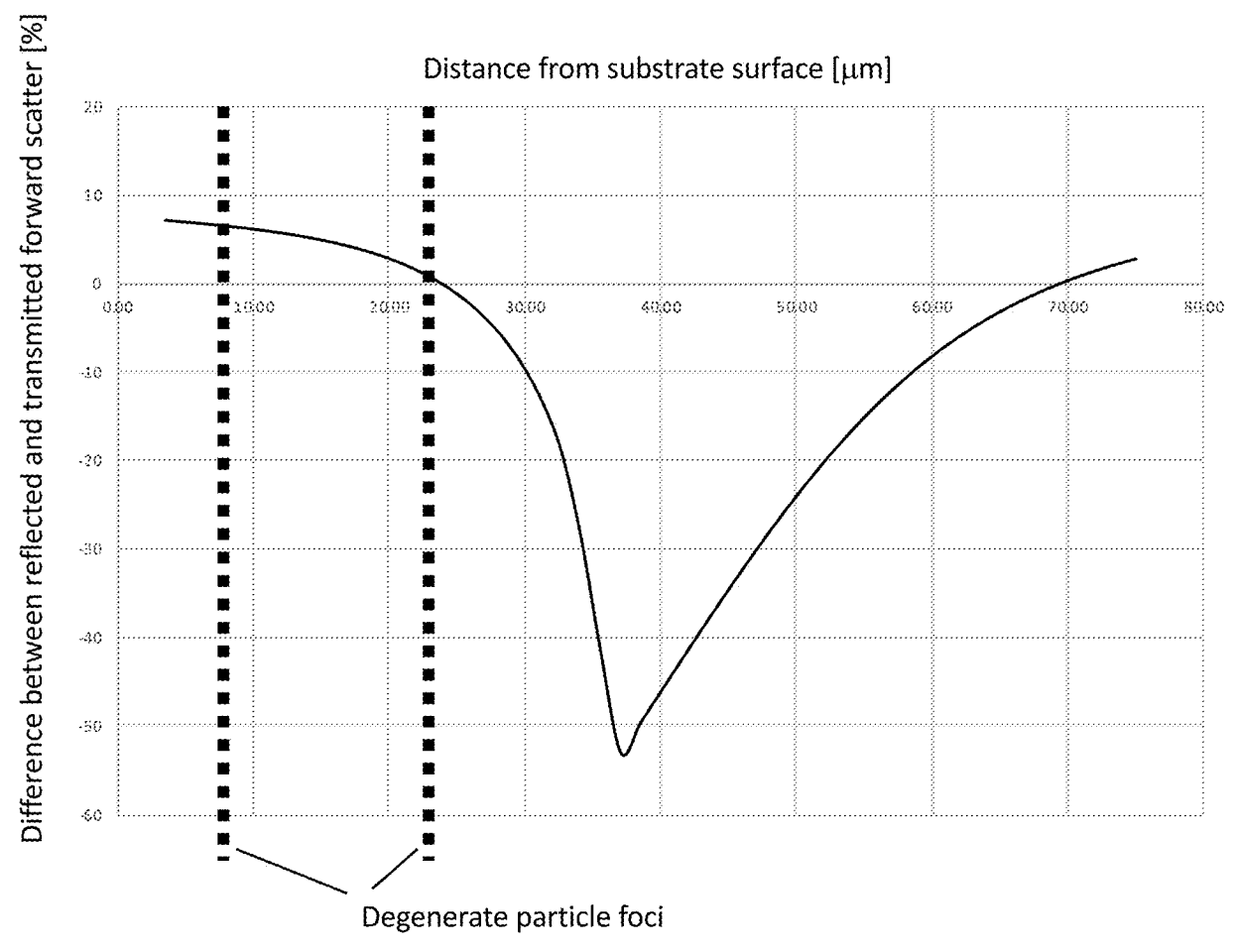
Figure 3:
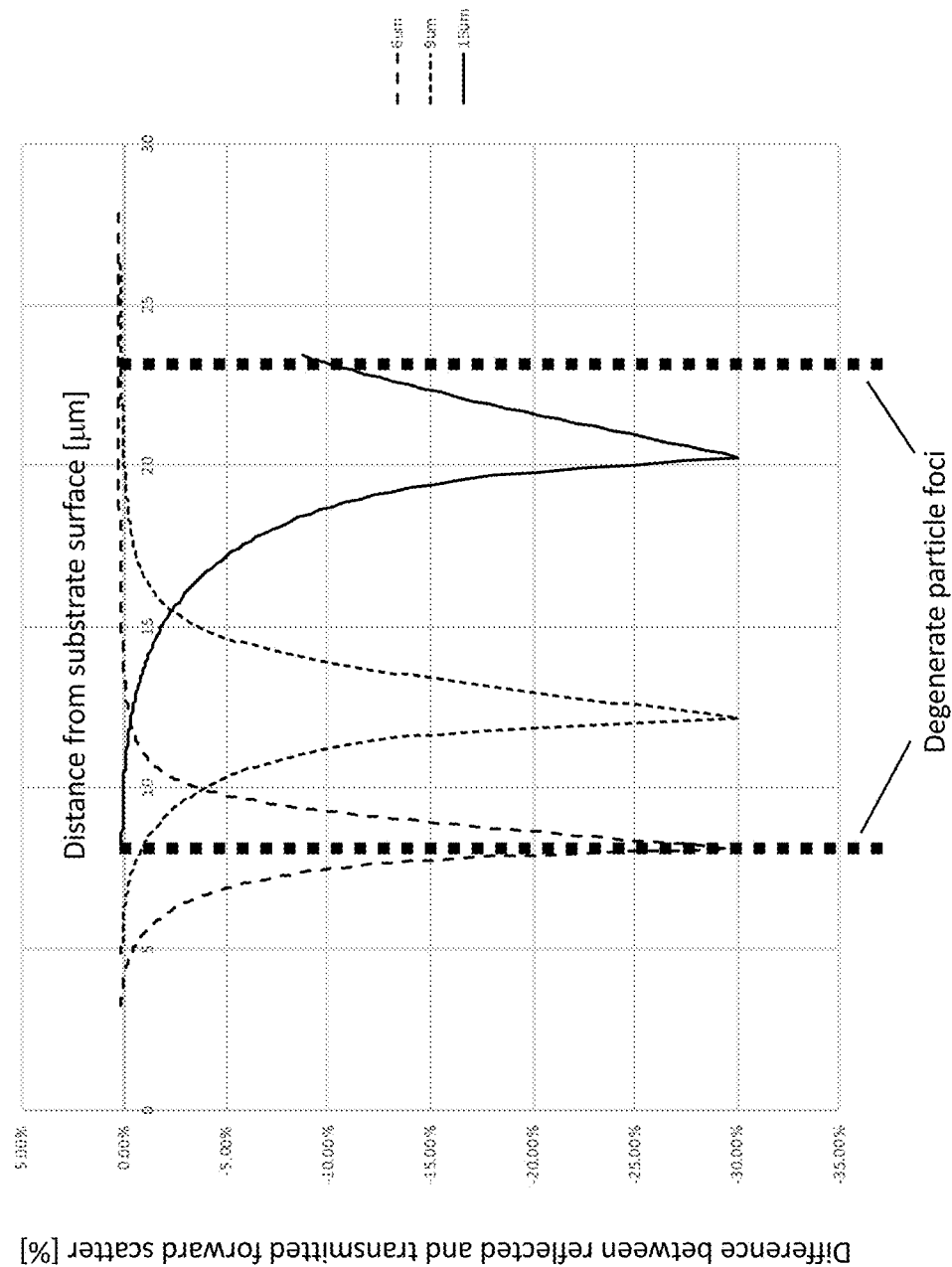
FIG. 3 shows ray tracing predictions of rFSC measurements of polystyrene beads of different diameters as a function of distance from the substrate.

FIGS. 2 and 3 show predictions of rFSC for particles with different diameters and refractive indices. The medium is modelled with the refractive index of water (1.33). The predicted measurements of rFSC are given as a percentage difference to the predicted measurements for FSC. The in this model were simulated using ray-tracing software (Zemax OpticStudio, Zemax LLC, Kirkland, Washington 98033, USA).

FIG. 2 shows the prediction for lymphocytes, which have a refractive index of 1.37 and a diameter of around 6 μm. The percentage difference between the predicted measurements for rFSC as compared with the predicted measurements for FSC are shown as a function of distance of the particle from the lower surface of the channel, while the degenerate inertial foci for channels of 31 microns height are labelled. There is approximately 5% difference in rFSC between the degenerate foci, and as such the error in rFSC measurements of lymphocytes of around 5% CV is not unduly large compared with the variability between lymphocytes of around 30% CV. The example of lymphocytes is typical of most biological cells, particularly mammalian cells.

FIG. 3 shows the prediction for polystyrene beads, which have a refractive index of 1.6, of three different diameters—6 μm, 9 μm, and 15 μm. The locations of the particle foci are once again shown for a channel of 31 microns in height. For particles of 6 μm and 15 μm in diameter there is a significant difference in rFSC between the degenerate foci. However, for beads 9 μm diameter the difference in measurements of rFSC is small enough (approximately 1%) that the beads are still useful as a measurement standard. Typically, a CV of 5% or less will be low enough that the particles may still be used for standardization, set-up, calibration, and quality control of a flow cytometer, although a CV of 2% or less is more preferable.

Figure 4:
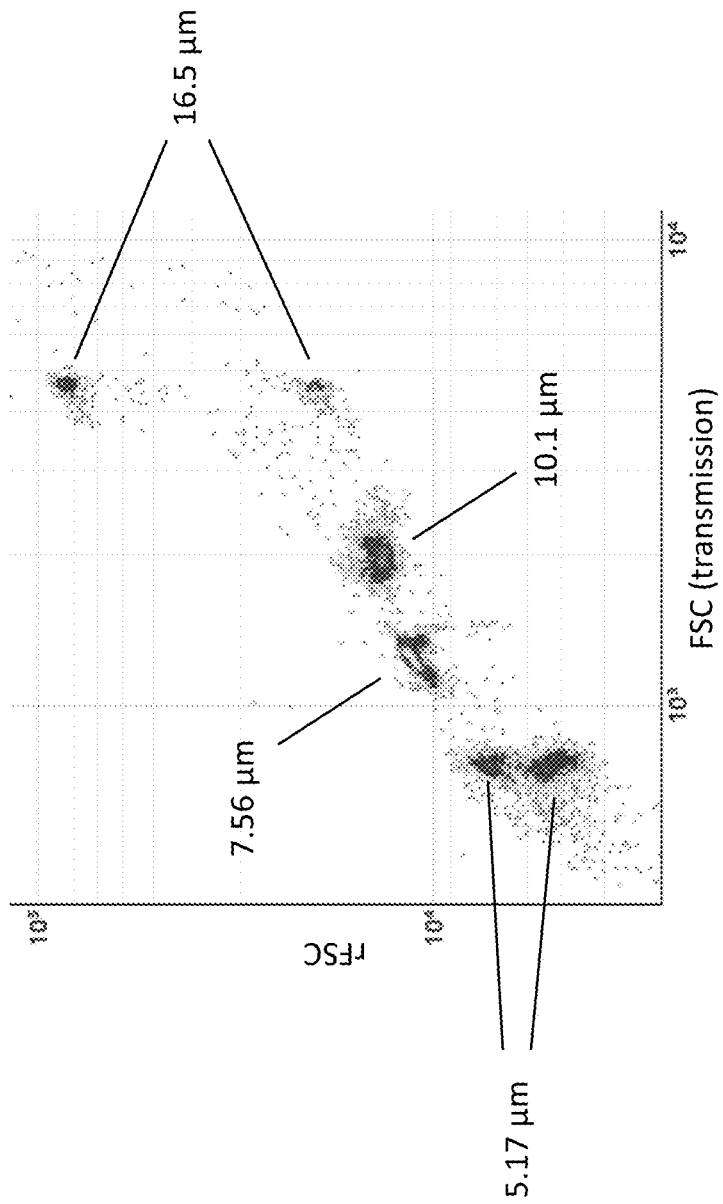
FIG. 4 shows experimental measurements of reflected versus transmitted forward scatter measurements from polystyrene size calibration beads of different diameters.

FIG. 4 shows the measurement of polystyrene size calibration beads in an experimental system, where transmitted and reflected forward scatter have been measured simultaneously, and are plotted as a 2D histogram (commonly known in cytometry as a dot plot). Peaks in measurements for polystyrene beads of a diameter of 5.17, 7.56, 10.1, and 16.5 µm are annotated. This experimental result is approximately in agreement with the simulation, and verify that by selecting polystyrene beads with a diameter in a range of approximately 7 to 10 µm, the effects of the degeneracy in the particle foci are substantially removed, yielding a single rFSC measurement of the bead.

The invention claimed is:

1. A method of a standardization and/or a calibration of a flow cytometer having a first channel, the first channel having two or more particle focal points such that particles flowing through the first channel are focused at said two or more particle focal points, the method comprising:
  (a) for each particle type of two or more different particle types:
  (a1) for each particle focal point of the two or more particle focal points, determining, for a light beam directed at a particle of at least a first particle type or a second particle type at one of said two or more particle focal points from a first direction, a total intensity of scattered light along a second direction, wherein the first direction is a propagation direction of the light beam, and the second direction is within 90 degrees of the first direction, and
  (a2) determining, for the first particle type or the second particle type, a difference between a highest light intensity and a lowest light intensity of the light scattered along the second direction determined at the two or more particle focal points; and
  (b) selecting, based on the determined differences, as a standard particle type, the first particle type or the second particle type for which the difference between the highest light intensity and the lowest light intensity at the two or more particle focal points is below a predetermined threshold; and
  (c) using the selected standard particle type in the standardization and/or the calibration of the flow cytometer, wherein the scattered light along the second direction is reflected from the particle, refracted by the particle, and reflected from a lower surface of the first channel, wherein the flow cytometer comprises an inertial focuser upstream of the first channel, and wherein a lower surface of the first channel is opaque.

2. The method according to claim 1, wherein a refractive index of the first particle type is equal to the refractive index of the second particle type.

3. The method according to claim 1, wherein a diameter of the first particle type differs from the diameter of the second particle type.

4. The method according to claim 1, wherein the first direction lies along a normal to a lower surface of the first channel.

5. The method according to claim 4, wherein the second direction lies at an angle of less than about 20 degrees to the first direction.

6. The computer implemented method according to claim 1, wherein the two or more particle focal points lie on a normal to a lower surface of the first channel.

7. The method according to claim 1, wherein the predetermined threshold is less than or equal to about 10%.

8. The method according to claim 7, wherein the predetermined threshold is less than or equal to about 5%.

* * * * *